Figure 1:
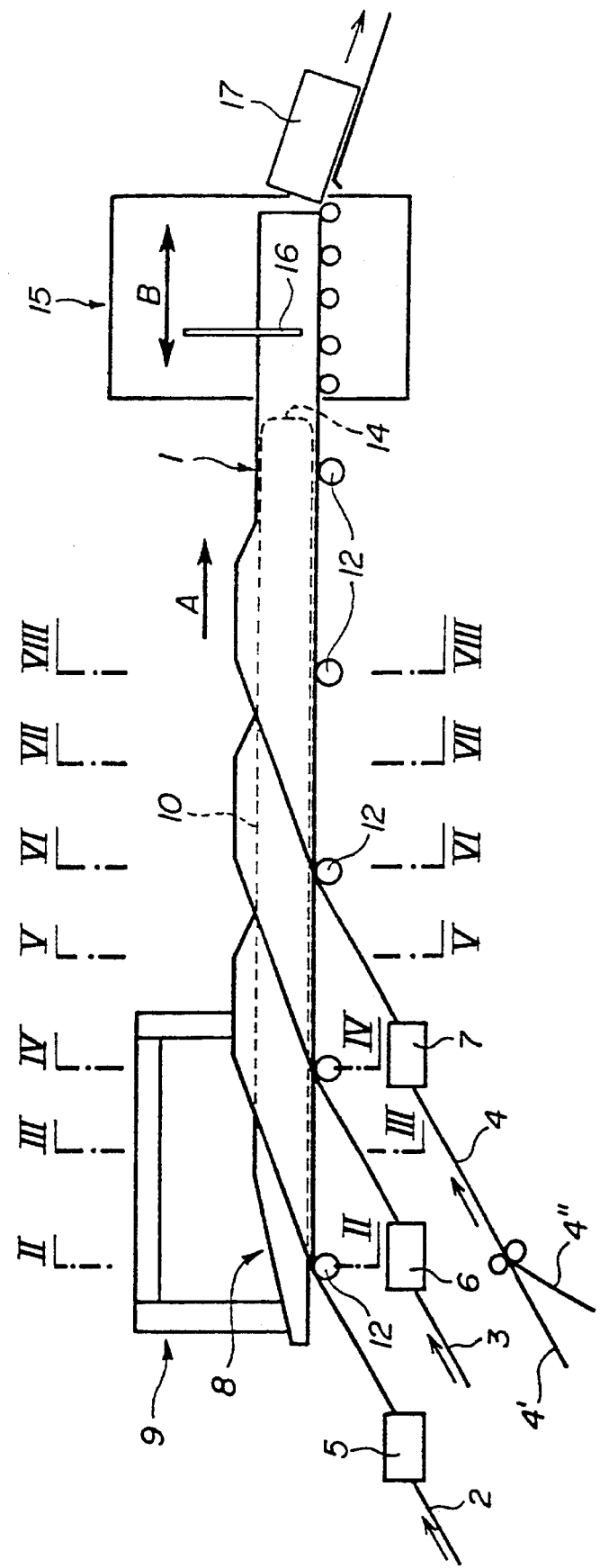

United States Patent

Franci

[11] Patent Number: 5,593,375
[45] Date of Patent: Jan. 14, 1997

[54] CONTINUOUS TUBULAR BOX BODY PRODUCTION PROCESS, PARTICULARLY FOR CARDBOARD BOXES

[75] Inventor: Franois-Marie Franci, Pontault-Combault, France

[73] Assignee: Pack'Industrie S.A., Rixheim, France

[21] Appl. No.: 335,785

[22] PCT Filed: Mar. 11, 1994

[86] PCT No.: PCT/IB94/00036

§ 371 Date: Nov. 10, 1994

§ 102(e) Date: Nov. 10, 1994

[87] PCT Pub. No.: WO94/20281

PCT Pub. Date: Sep. 15, 1994

[30] Foreign Application Priority Data

Mar. 12, 1993 [FR] France .................................. 93 03052

[51] Int. Cl.$^6$ .............................. B29C 53/50; B31B 5/36
[52] U.S. Cl. ............................................ 493/302; 493/276
[58] Field of Search ................................... 493/294, 295, 493/296, 297, 299, 300, 301, 302, 303, 304, 272, 276, 285

[56] References Cited

U.S. PATENT DOCUMENTS

| | | | |
|---|---|---|---|
| 1,868,870 | 7/1932 | Bergstein . | |
| 2,256,263 | 9/1941 | Haycock | 93/82 |
| 2,828,239 | 3/1958 | Fischer | 154/83 |
| 2,832,271 | 4/1958 | Jarund | 493/302 |
| 2,933,988 | 4/1960 | Stark | 93/82 |
| 2,992,674 | 7/1961 | Cunningham | 154/1.8 |
| 3,064,544 | 11/1962 | Stark | 93/94 |
| 3,196,762 | 7/1965 | Schmeltz | 493/294 |
| 3,304,844 | 2/1967 | Hosenfeld | 493/302 |
| 3,323,964 | 6/1967 | Young | 156/203 |
| 3,412,656 | 11/1968 | Corneliusson | 493/302 |
| 3,563,825 | 2/1971 | Segura | 493/297 |
| 3,574,034 | 4/1971 | Harvey | 493/297 |
| 3,656,513 | 4/1972 | Evans | 138/141 |
| 3,908,526 | 9/1975 | Vassalos | 493/295 |
| 4,300,963 | 11/1981 | Berg | 493/297 |
| 4,353,764 | 10/1982 | Sireix | 493/302 |
| 4,441,948 | 4/1984 | Gillard | 156/189 |
| 4,474,564 | 10/1984 | Sireix | 493/279 |
| 4,478,670 | 10/1984 | Hayse | 493/302 |
| 4,629,529 | 12/1986 | Kadunce | 156/428 |
| 4,834,822 | 5/1989 | Uebergger | 493/302 |
| 4,871,347 | 10/1989 | Brinkmeier | 493/302 |
| 4,876,960 | 10/1989 | Shinomiya | 493/302 |
| 5,287,681 | 2/1994 | Vernon | 493/302 |

FOREIGN PATENT DOCUMENTS

| | | |
|---|---|---|
| 2021646 | 7/1990 | Canada . |
| 0387171 | 9/1990 | European Pat. Off. . |
| 1130714 | 2/1957 | France . |
| 0409021A2 | 7/1990 | Switzerland . |

*Primary Examiner*—Joseph J. Hail, III
*Assistant Examiner*—Christopher W. Day
*Attorney, Agent, or Firm*—Davis and Bujold

[57] ABSTRACT

A continuous tubular box body production method, particularly for cardboard boxes, using a number of stacked longitudinal strips. After sizing the continuously moving straps (2, 3, 4), they are applied lengthwise against a stationary guide (8) ending in a mandrel (10) with a circumference defining the cross-sectional shape of the tubular body (1, 17), whereby each strip has a side flap on either side of the guide which is then folded down around the circumference of the mandrel (1) as the strips move therealong. The method is characterized in that the side flaps (2a, 1b; 3a, 3b; 4a, 4b) are at least partially asymmetrically folded down so that one of the flaps on each strip is folded down before the other, whereby various longitudinal joint configurations and arrangements may be achieved, wherein the joints are arranged above one another or offset in alternate directions.

13 Claims, 5 Drawing Sheets

CONTINUOUS TUBULAR BOX BODY PRODUCTION PROCESS, PARTICULARLY FOR CARDBOARD BOXES

The present invention concerns a process for the continuous manufacture of tubular bodies of boxes, particularly for cardboard boxes, by means of several superposed longitudinal webs, in which webs are continuously moving, glue is applied on at least one side of one or more webs and then these webs are applied lengthwise against a stationary guide ending by mandrel whose circumference defines the transversal profile of the tubular body, this application being performed according to a generating line of the tubular body so that each web has a side flap on either side of the said generating line and being followed by a folding of said side flaps around the mandrel whilst the webs move along the latter.

The U.S. Pat. Nos. 2 256 263 and 3 064 544 describe such a process and machines designed to continuously manufacture tubular bodies of recipients made of several layers of paper by superposing and gluing continuous webs arranged lengthwise, the width of which being equal to the perimeter of the tube to be formed. In this process, the webs are moved forward simultaneously, glue is applied to some of their surfaces, these webs are superposed so that they are slightly offset sideways, they are pressed flat between two rollers to form one multilayer web and then the web obtained is slided along the stationary guide whilst being progressively applied against the latter to give it the tubular shape desired before the glue hardens. Both edges of the initial webs are then placed next to each other to form a longitudinal joint without overlapping each other, the transversal continuity of the tube's multilayer wall being achieved by the mutual offsetting of the joints of the various layers. In the U.S. Pat. No. 3 064 544 there is also provision for both edges of each web to be able to overlap and possibly be bevelled. The tube is then cut into sections to form tubular bodies.

The advantage of this well-known manufacturing process is that it is implemented by means of a relatively simple device but it presents serious drawbacks in terms of the quality of the tubular bodies manufactured.

In particular, while bending the multilayer structure, moistened by the glue, inward transversely, the inner layers tend to crease instead of sliding on the outer layers. There is even provision in U.S. Pat. No. 3 064 544 to mark in advance the position of the folds by forming grooves on the webs. The creasing phenomenon is particularly noticeable in the angles of the tubes with a polygonal cross section. It leads to the inside of the tube being in bad condition, irregularities in the thickness and the compactness of the multilayer structure, as well as a weakening of the tube's wall as only the layers not creased withstand transversal stress. Furthermore, a crease in a layer means there is a narrowing of the corresponding web, therefore preventing the edges of this web from joining properly. The joint becomes too wide and moves closer to the previous or next joint which weakens the tube. Moreover, if a layer does slide sideways on the other one, it may do so in an unpredictable manner, more so on either side of the generating line applied first of all against the stationary guide, in such a way that the joints of two successive layers may be too close to one another and thus excessively weaken the tube. Another drawback with this process is that the joints need to be quite close to one another and cannot be set out staggered (i.e. offset first in one direction and then in the other), which allows greater solidity of the wall where they are located.

The European patent application EP-A-0 387 171 describes a process which aims to avoid excessive thicknesses due to both the longitudinal edges of each web overlapping and at offsetting the joints of successive layers sufficiently so as to not weaken the wall of the tubular body. The proposed solution consists in forming each layer successively by applying two webs which each cover a respective part (e.g. half of the perimeter of the mandrel whose edges are adjacent and contiguous without overlapping, i.e. they are only bonded by gluing to the neighbouring layers. The result of this is two longitudinal discontinuities in each layer and therefore a certain weakening of the tubular body's wall. Furthermore, there are twice as many webs to be applied and joints to be formed as the number required with a traditional process, which complicates the machines applying such a process.

The aim of the present invention is to create a manufacturing process that obtains tubular bodies of good quality, while avoiding the above-mentioned phenomena of creasing and achieving a precise geometry of the longitudinal joints so as to guarantee the desired strength of the tube's wall in the area(s) where these joints are located.

In this aim, the invention concerns a process of the type mentioned in the preamble, characterized in that the side flaps are folded at least partially asymmetrically so that one of the two flaps of a web is folded before the other one, the second flap being fully folded before the first flap of the next web.

In this way, each side flap of each web is folded individually at least in the final phase which has the effect of forming each layer's longitudinal joint. This makes it possible not only to avoid creasing problems, but also to shape each joint individually, particularly by compressing each lap joint, and to freely position the joints in relation to one another, e.g. by superposing, in stair or staggered fashion, depending on the cases and the configuration of the joints. Furthermore, applying the webs against a generating line of the guide or mandrel can be done either successively or simultaneously, as long as the webs applied simultaneously are not glued to one another in the vicinity of their edges, so that the latter can be folded individually.

If the webs are applied successively along the generating line, provision can be made to apply a second web over a first one only after having started to fold the side flaps of the first web, which avoids any gluing between the webs in the parts which are not yet fully shaped.

In one particular form of the process, the said generating line is located on a bottom side of the stationary guide and of the mandrel, and the folding of a web's side flaps involves a first phase in which both the flaps are folded on sides of the guide and/or the mandrel, a second phase in which the folding of one of the flaps is completed on the top of the mandrel, and then a third phase in which the folding of the other flap is completed. In a first alternative, the folding of one of the flaps is started before starting to fold the other. In another alternative, both flaps are folded simultaneously during the said first phase.

Another particular form of the process according to the invention consists in that said generating line is located on a bottom side of the stationary guide and of the mandrel, in that several webs are first of all applied along the said generating line, the side flaps of the webs are then folded simultaneously on sides of the guide and/or the mandrel, while keeping the longitudinal edges of the webs apart, the first flap of a first web then being folded on the top of the mandrel followed by the other flap of the first web, and then the first flap of a second web followed by the other flap of the second web, and so on.

A particularly advantageous form of the process consists in that longitudinal edges of at least one of the webs are shaped with a bevelled edge in the web's thickness and overlap in the form of a bevelled joint after both the said web's side flaps have been completely folded. In another form, the longitudinal edges of at least one of the webs are stepped, by crushing the edges before applying them on the mandrel, and overlap in the form of a step joint after both the said web's side flaps have been fully folded. The bevelled or step joints of at least two successive webs can be superposed, these two webs being applied without being offset sideways.

According to an alternative embodiment, at least one of the said webs is a composite web formed by continuous assembly of at least two individual webs before being glued and applied against the guide.

According to another alternative, a tight, inner sheath is made continuously inside the tubular body by means of a first web made of an impermeable material which is applied continuously against the guide, and then around the mandrel until both this web's longitudinal edges are applied one against the other, these two edges then being sealed together before they are overlapped by a second web.

Other features and advantages of the process according to the invention shall be highlighted in the following description of various preferred forms of embodiment of the process employed for the continuous manufacture of a cardboard tube with a more or less rectangular cross section which is then cut up into sections to form bodies of boxes, with reference being made to the attached drawings, in which:

FIG. 1 is a simplified schematic side view of a manufacturing device employing the process according to the invention, in a first form of embodiment, FIGS. 2 to 8 are schematic cutaway views along the lines II—II to VIII—VIII of FIG. 1 respectively, showing the successive stages of the process.

Figure 9:
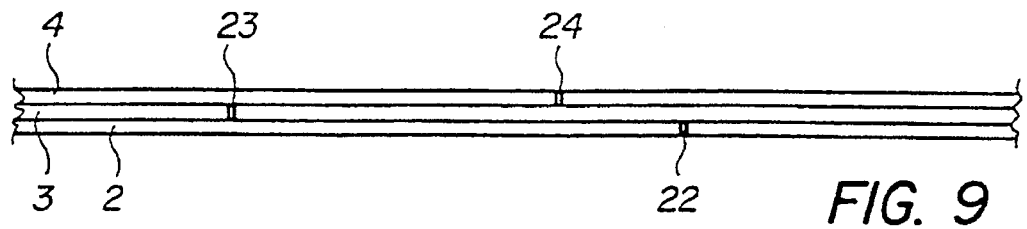
Figure 10:
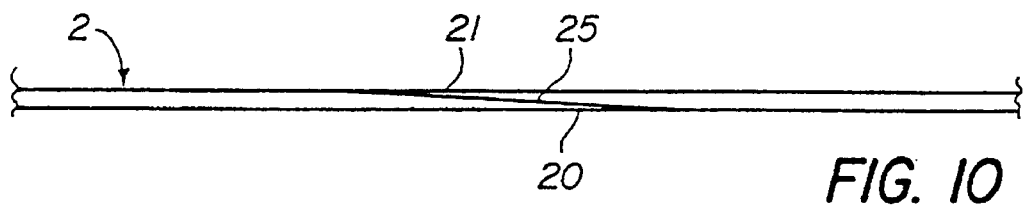
Figure 11:
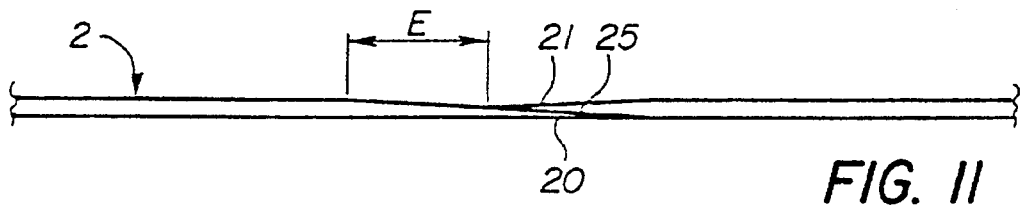
Figure 12:
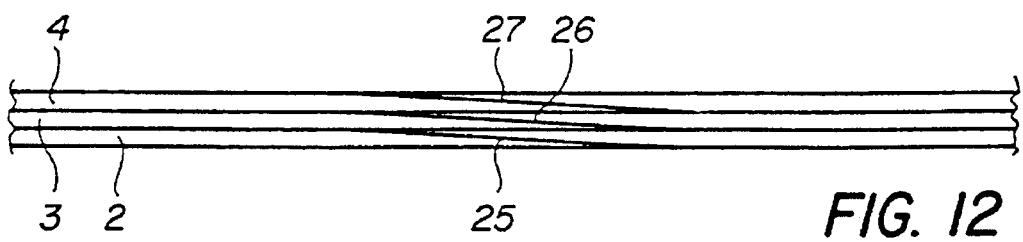
Figure 13:
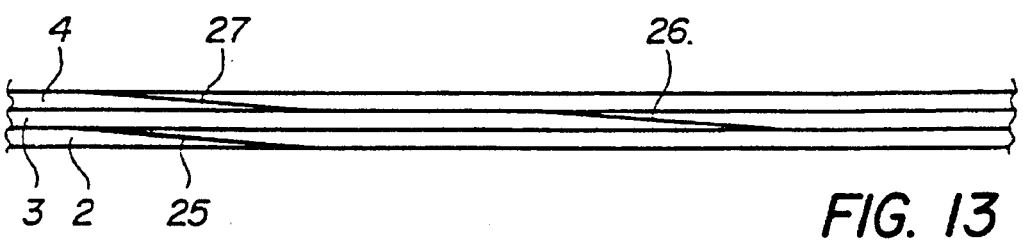
Figure 14:
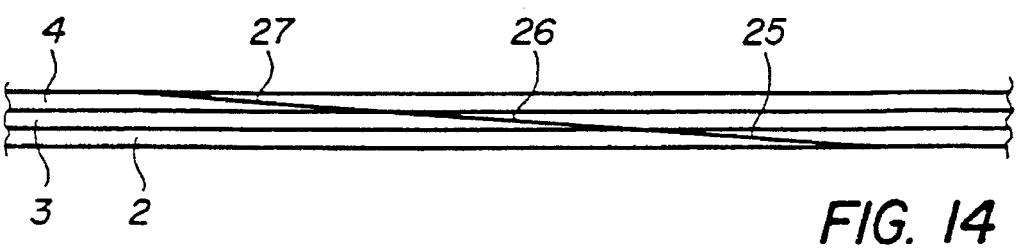
Figure 15:
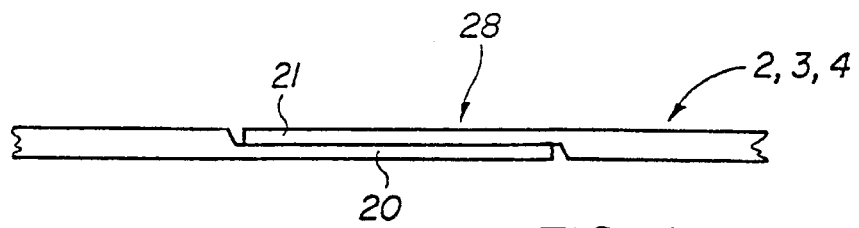
Figure 16:
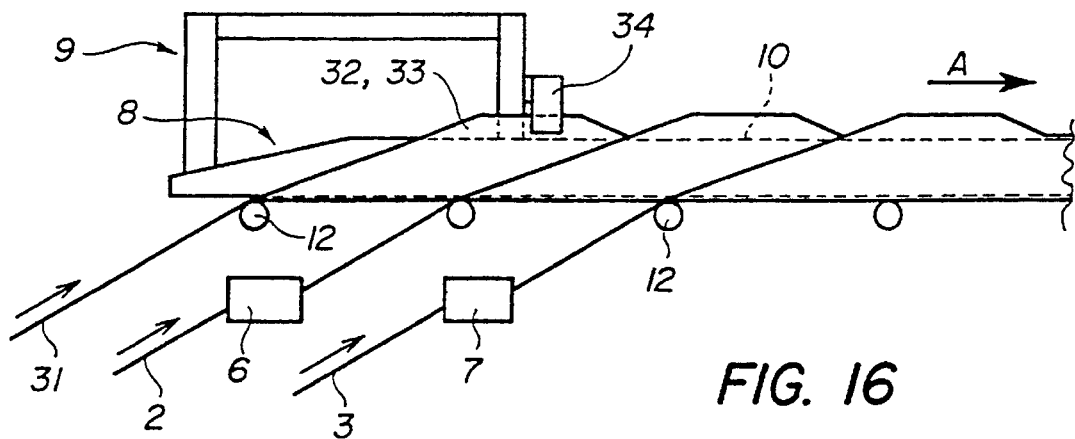
Figure 17:
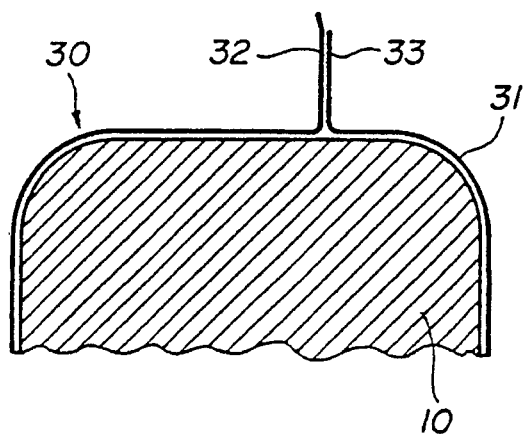
Figure 18:
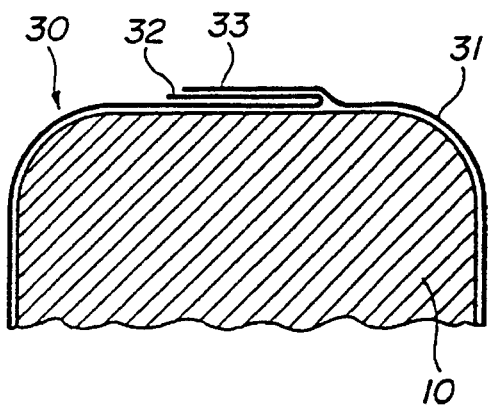
Figure 19:
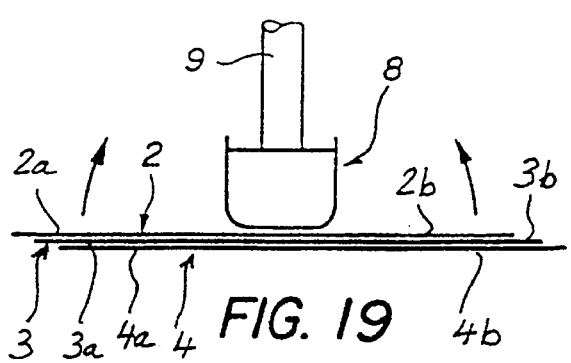

FIG. 9 is an enlarged cutaway view of the wall of a tube manufactured according to a particular form of the process, FIG. 10 is an enlarged cutaway view of a longitudinal joint formed by the edges of a web used in another particular form of the process, FIG. 11 is a similar view to the one in FIG. 10, showing a slightly defective configuration of the joint, FIGS. 12 to 14 illustrate three possible layouts of joints according to FIGS. 9 and 10, FIG. 15 is a similar view to the one in FIG. 10 and shows another form of embodiment of a longitudinal joint, FIG. 16 is a similar partial view to the one in figure I and shows a particular form of embodiment of the invention, to manufacture tubular bodies with a tight inner sheath, FIGS. 17 and 18 are detailed cutaway views of one longitudinal joint in the inner sheath made according to FIG. 16, and FIGS. 19 to 26 are schematic cutaway views showing the successive stages of another form of embodiment of the process according to the invention.

The system shown in FIG. 1 is primarily well-known in the field of continuous manufacture of tubes made of cardboard or similar material. This is why the drawing only shows the structural parts which are essential to understand this invention. In this example, the cardboard tube 1 is manufactured by superposing three webs 2, 3, 4 of paper or other suitable materials, arranged lengthwise, the width of each web corresponding to the perimeter of tube 1. Each web 2, 3, 4 is delivered continuously from a feed roller which is not shown and passes through a respective gluing facility 5, 6, 7 before being applied against a stationary guide 8 or against the previous web which is already applied against the guide. The latter is supported at its rear end by a frame 9, whereas the rest of the guide 8, in a forward direction, is a horizontal mandrel 10 with a constant cross section corresponding to the inner cross section of the tube 1. This cross section can in particular be circular or polygonal. In the present case, it is approximately the shape of a rectangle with rounded corners. The mandrel 10 and the tube 1 which encircle it are supported and guided by lower rollers 12, lateral and upper rollers (not shown), which rotate and are driven by a motorized mechanism to make the tube 1 go forward according to the arrow A along the guide 8.

Likewise, guide rollers (not shown) are provided to guide and move the side flaps of the webs 2, 3, 4 in order to apply them gradually against the guide 8 or the tube being formed, as shall be described later on. When the tube 1 reaches the front end 14 of the mandrel 10, it goes into a cutting device 15 fitted with cutting equipment 16 which moves to-and-fro according to the arrow B to cut up the tube into equal parts 17 making up tubular bodies for cardboard boxes.

It is worth noting that at least one of the webs 2 to 4 can be a composite web, i.e. made up of two or more layers of similar or different materials. For example, in figure 1, we can see that the last web 4 is a composite web which is made, immediately before it is glued and applied on the previous web 3, by assembling one web of cardboard 4' and one web of printed paper 4" making up the visible surface of the tubular bodies 17.

Although the parts described above are theoretically well-known, figure I shows a specific aspect of a particular embodiment of the invention, i.e. the webs 2, 3 and 4 are not applied simultaneously against the bottom side of the guide 8, but one after the other, once the work of forming the previous web has already started. The stages involving the forming of the successive webs are illustrated by FIGS. 2 to 8, in which the rollers for guiding and moving the webs have again been left out to make the drawing as clear as possible.

Figure 2:
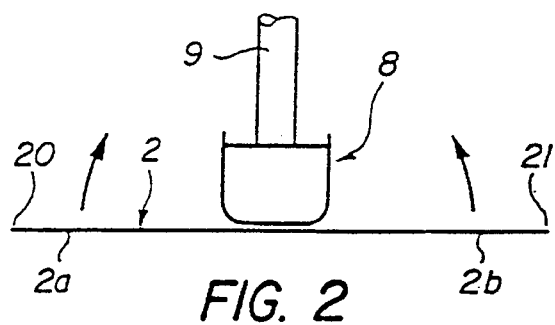
Figure 3:
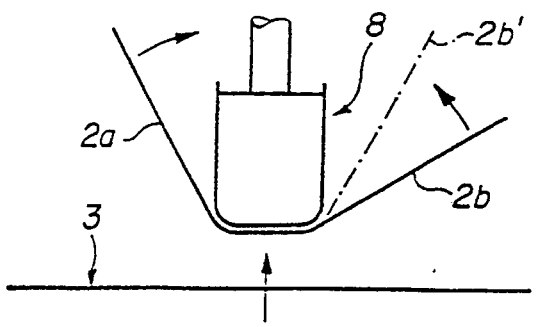

When reaching FIG. 2, the middle part of the first web 2 is applied against the bottom horizontal side of the guide 8, on either side of which the web 2 forms a first side flap 2a and a second side flap 2b. These flaps may be of equal or unequal widths, depending on the position of the tube's generating line where their free edges 20 and 21 will have to join. If the tube was a cylindrical shape, at this stage the web 2 would be applied only against a generating line on the guide's 8 surface. From the position in FIG. 2, the flaps 2a and 2b start to be folded upward as shown by the arrows in FIGS. 2, 3 and 4. In this example, the folding is performed asymmetrically from the start, with flap 2a moving ahead of flap 2b, which offers the advantage of only starting the bendings of the web successively on the guide's two lower angles, so that the friction stress is distributed more evenly over the length of the web. However, the folding can also be performed symmetrically at this stage, as position 2" of the second flap illustrates in FIG. 3.

Figure 4:
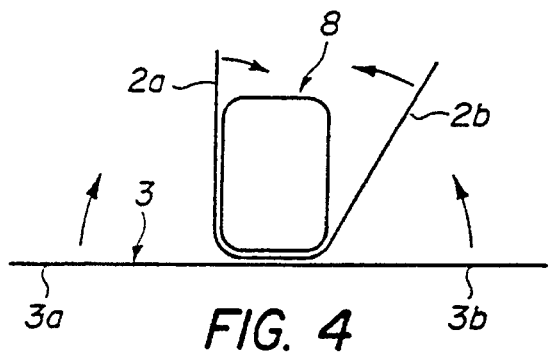
Figure 5:
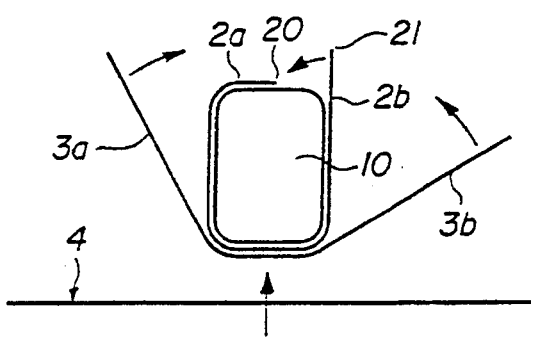
Figure 6:
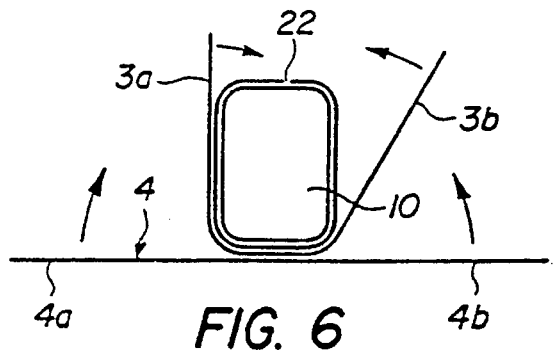

As soon as the folding of the two flaps 2a and 2b has started, the second web 3 can be applied on the first one in the region of the bottom side of the guide 8, as FIG. 4 shows, presenting two side flaps 3a and 3b. As the bending of the first web on the angles which border this side has already started and almost finished, there are no interfering shearing loads between the two successive webs when bending the second web, contrary to the case where the two webs would be glued already. In the meantime, the folding of the flaps 2a and 2b of web 2 continues and finishes as shown in FIGS. 4 and 5, i.e. the first flap 2a is folded first on the top side of the mandrel 10 and the second flap 2b is then folded so that both edges 20 and 21 of the web meet to form a longitudinal joint 22 (FIG. 6). This joint can be of various types and shall be dealt with later on.

Figure 7:
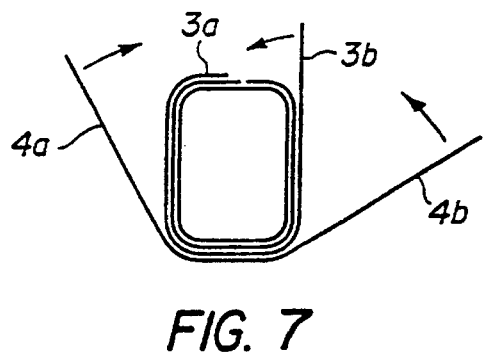
Figure 8:
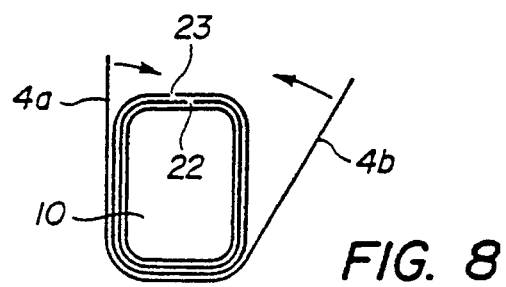

The web 2 is thus the first layer in the cardboard box, on which the flaps 3a and 3b of the second web can be folded in the same way as flaps 2a and 2b, as can be seen in FIGS. 5 to 7. The edges of the web 3 meet to form a longitudinal joint 23 (FIG. 8) which can be offset sideways in relation to the first joint 22 if the web 3 has initially been applied with the desired offset.

Applying the third web 4 and folding its side flaps 4a and 4b is performed in the same way as for the web 3.

FIG. 9 illustrates a possible layout of the longitudinal joints 22, 23, 24 of the webs 2, 3, 4 in the case where the edges of each web are simply juxtaposed without overlapping. The joints must then be offset sideways, which requires a corresponding offset of the webs.

With the present invention, it is useful to avoid such a weakening of the tube's wall, by having a mutual overlap and gluing the edges of each web 2, 3, 4, with these edges being shaped with a bevelled edge as shown in FIGS. 10 to 13.

The example in FIG. 10 shows an ideal configuration for the bevelled joint 25 of the two edges 20 and 21 of web 2, which are reduced slantwise over a width greater than the thickness of the web 2. At least one of the two edges is glued with the adjacent side of the web. The precise positioning of the edges which is achieved by the process according to the invention, due to each web being applied separately, means that the edges 20 and 21 applied one after the other on the mandrel meet up well, in the configuration in FIG. 10. The joint 25 is then glued and will ensure a continuous transmission of the stress in this layer of the tube. Nevertheless if the web shows signs of a slight width variation, for example, a narrowing E, the offset which results from it at joint 25 (FIG. 11) narrows the zone glued by as much but does not generally remove it. On the one hand, the layer remains continuous and on the other hand, the offset E creates neither a vacuum nor a noticeable variation in the thickness of the multilayer wall of the tube.

FIGS. 12 to 14 show three different layouts of the joints 25, 26 27 of the three layers or webs 2, 3, 4 making up the tube's wall. In the case of FIG. 12, the three joints are superposed, i.e. the three webs can be brought in without any mutual offset when manufacturing the tube. Due to each joint being glued, the resistance and rigidness of the wall are not affected in this zone. In the case of FIG. 13, the intermediate web is offset in relation to the other two as a safety measure, in order to avoid weakening the wall if two successive joints were to have a configuration like the one in FIG. 11 by accident. In the example in FIG. 14, the three joints 25, 26, 27 are mutually offset to an extent equal to the width of each joint, so that they are more or less the continuation of one another.

Instead of the joints with bevelled edges illustrated in FIGS. 10 to 14, it is possible to have stepped joints such as the longitudinal joint 28 shown in FIG. 15. In this case, each of the longitudinal joints 20 and 21 of the web 2, 3, 4 has been crushed continuously just before being applied on the mandrel, so that its thickness is reduced to approximately half the thickness of the web. In this way, superposing the two edges 20, 21 as shown in FIG. 15, does not increase the thickness of the wall of the tubular body. The joints of the successive webs can be either superposed or wedged, like the joints with bevelled edges described above. FIGS. 16 to 18 illustrate the production of tubular bodies, whose wall has, in addition to two layers of cardboard formed by using webs 2 and 3, a tight inner sheath 30 made by means of a first web 31 made of an impermeable material, e.g. an aluminium-polyethylene or paper-polyethylene composite material. The width of the web 31 is slightly bigger than the perimeter of the mandrel 10, so that two longitudinal edges 32, 33 are left overhanging when the sheet 31 is fully applied on the mandrel 10. Both edges 32 and 33 are then applied against one another, face to face in a more or less radial plane, as shown in FIG. 17, and sealed along the line with appropriate equipment 34, e.g. by ultrasonic sealing, to close the tight sheath 30. The two edges assembled 32, 33 are then folded laterally over the sheath 30 as shown in FIG. 18 and glued onto the latter, either continuously or discontinuously, before being overlapped by the next web 2. The tubular bodies formed in this way are used to manufacture boxes offering excellent tightness, product preservation, safety and impregnability qualities, thanks to it being possible to seal the bottoms and covers to the inner sheath 30.

Figure 20:
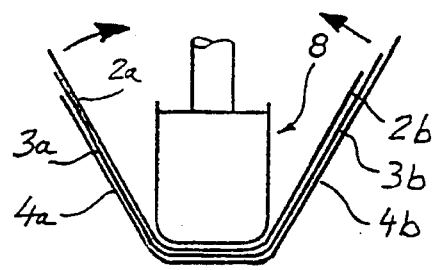
Figure 21:
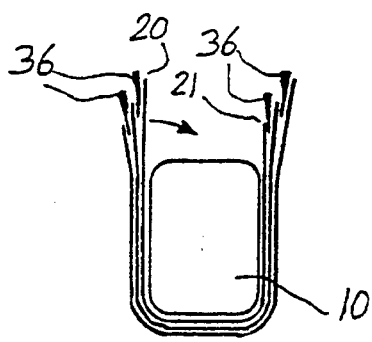
Figure 22:
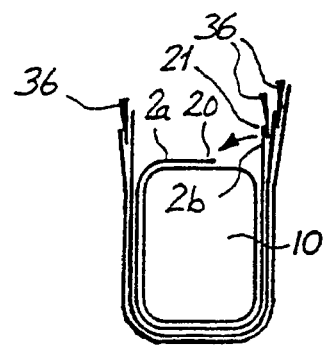
Figure 23:
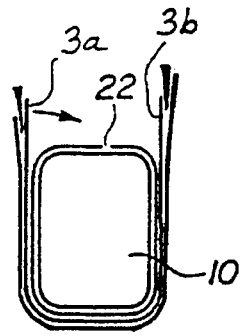
Figure 24:
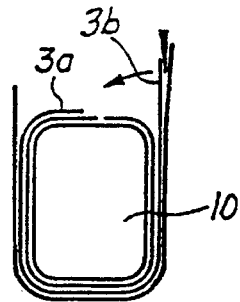
Figure 25:
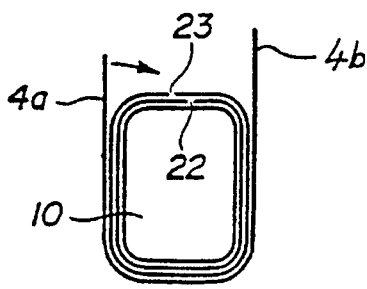
Figure 26:
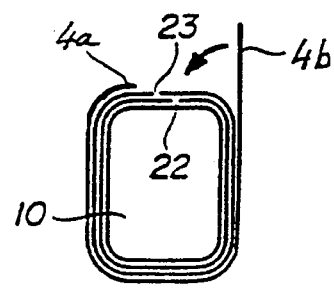

FIGS. 19 to 26 are similar views to the ones in FIGS. 2 to 8, but illustrate an alternative to the process according to the invention. In this case, the webs 2, 3, 4 are first of all applied along the bottom side of the guide 8, successively as shown in FIG. 1 or simultaneously with the three webs arriving together on a first lower roller similar to the rollers 12 in FIG. 1, to take up the position illustrated by FIG. 19. The three webs are thus glued one to the other in the middle part applied against the guide 8. Their side flaps 2a, 2b, 3a, 3b, 4a and 4b are then folded together and simultaneously on both sides of the guide 8, as shown in FIGS. 20 and 21, while keeping the longitudinal edges 20 and 21 of the various webs apart by means of longitudinal guiding devices 36 which can be continuous or discontinuous.

From the position in FIG. 21, the final folding of the side flaps 2a, 2b to 4a, 4b is performed separately alternately as shown by the arrows in FIGS. 22 to 26, so that the edges 20 and 21 of the successive webs meet in the same way as in FIGS. 4 to 8.

In comparison with the first form of embodiment described above, this alternative makes it possible to simplify the guiding devices to apply the side flaps on the sides of the guide or mandrel. Of course the glue which bonds the webs when folding them on the bottom side of the guide 8 must be soft enough to allow transversal sliding between the webs in order to avoid creasing, but this sliding is made easier by the fact that the edges of the webs are kept apart. As for the rest, this alternative offers the same advantages and the same possibilities in terms of the configuration of the joints as the embodiments described above.

I claim:

1. In a process for continuous manufacture of tubular container bodies (17) from a plurality of continuously moving, superposed longitudinal webs (2,3,4) wherein:

glue is applied on at least one surface of at least one of said webs (2,3,4) and said webs are then applied lengthwise against each other in a superposed relationship and against a longitudinally extending, stationary guide (8) that terminates longitudinally in a mandrel (10) having a circumference defining a transverse profile of said container bodies (17); and said webs (2,3,4) are applied against each other and against said guide (8) along a longitudinally extending generating line of each of said container bodies so that each web has two side flaps (2a,2b;3a,3b;4a,4b) on opposite lateral sides of said generating line and said guide (8) and then said side flaps are folded around said guide (8) and said mandrel (10) while said webs move longitudinally along said guide and said mandrel; the improvement comprising the steps of:

a) successively applying and folding each of said webs (2,3,4) against said guide (8) and along said generating line, so that the two side flaps (2a,2b) of an inner first web (2) of the container body (17) are partially folded around said guide (8) and said mandrel (10), but are not completely folded around said guide (8) and said mandrel (10), before an adjacent outer second web (3) of the container body is applied against said guide, whereby the successive application and folding of each of said webs (2,3,4) against and around said guide (8) and said mandrel (10), after partially folding respective side flaps (2a,2b;3a,3b;4a,4b) of previously applied webs (2,3,4), avoids glueing between said webs (2,3,4) in parts which are not completely folded and shaped around said guide (8) and said mandrel (10); and b) folding at least partially asymmetrically said two side flaps (2a,2b;3a,3b;4a,4b) of each web (2,3,4) about said guide (8), so that one of the two side flaps of each inner web is completely folded around said guide (8) before the other flap of the inner web is completely folded around said guide (8); said other flap being completely folded around said guide (8) before a first flap of an adjacent outer web is completely folded around said guide (8).

2. The process of claim 1 wherein said container body is a cardboard box.

3. The process of claim 1 wherein said mandrel (10) and said container body each have one of a circular and polygonal transverse profile.

4. The process of claim 1, wherein said generating line is on a bottom side of the stationary guide (8) and of the mandrel (10) and the step of folding the web's side flaps (2a, 2b) further comprises the steps of:

partially folding, in a first phase, the two flaps against opposite lateral sides of the guide;

completely folding, in a second phase, one of the flaps (2a) against a top side of the mandrel; and completely folding, in a third phase, the other flap (2b) against the top side of the mandrel.

5. The process of claim 4, wherein in the first phase, the folding of one (2a) of the flaps is started before starting to fold the other flap (2b).

6. The process of claim 1, wherein opposite lateral edges (20, 21) of at least one of the webs (2, 3, 4) are shaped with a beveled edge (25, 26, 27) and overlap in the form of a beveled joint after both of said web's side flaps have been completely folded.

7. The process of claim 6, wherein the beveled joints (25, 26, 27) of at least two successive webs (2, 3, 4) are superposed, said two webs being applied to said guide (8) without being offset laterally.

8. The process of claim 4, wherein in the first phase, the two flaps (2a, 2b) are folded simultaneously.

9. The process of claim 1, wherein opposite lateral edges (20, 21) of at least one of the webs are shaped in steps, by crushing said lateral edges before applying them on the mandrel, whereby said edges overlap in a form of a stepped joint (28) after both of said web's side flaps have been completely folded.

10. The process of claim 9, wherein the stepped joints (28) of at least two successive webs (2, 3, 4) are superposed, said two webs being applied to said guide (8) without being offset laterally.

11. The process of claim 1, wherein at least one of said webs (2, 3, 4) is a composite web made up of a continuous assembly of at least two individual webs (4', 4") before glue is applied to it and it is applied against the guide.

12. The process of claim 1, wherein a tight inner sheath (30) is made continuously inside the tubular body (17) by means of a first web (31) completed of an impermeable material which is applied continuously against the guide (8), and then around the mandrel (10) under both of this web's opposite lateral edges (32, 33) are applied one against the other, and then these two edges are sealed together before they are overlapped by a second web.

13. The process of claim 12, wherein the edges (32, 33) or said first web (31) are applied and then sealed face to face, in a substantially radial plane in relation to the mandrel, in that they are folded laterally and in that they are glued to said sheath (30) before being overlapped by a second web.

* * * * *